US012759544B2

(12) United States Patent
Woo et al.

(10) Patent No.: US 12,759,544 B2
(45) Date of Patent: Oct. 13, 2026

(54) ADAPTIVE DRIVER INTENT DETECTION FOR DRIVER AND VEHICLE TYPE

(71) Applicant: GM GLOBAL TECHNOLOGY OPERATIONS LLC, Detroit, MI (US)

(72) Inventors: Ami Woo, Calgary (CA); Mohammadali Shahriari, Markham (CA); Hassan Askari, Thornhill (CA); Reza Zarringhalam, Whitby (CA); Parisa Mahvelatishamsabadi, North york (CA); Khizar Ahmad Qureshi, Pickering (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 37 days.

(21) Appl. No.: 18/976,984

(22) Filed: Dec. 11, 2024

(65) Prior Publication Data

US 2026/0159079 A1 Jun. 11, 2026

(51) Int. Cl.

*B60W 30/095* (2012.01)
*B60W 60/00* (2020.01)

(52) U.S. Cl.

CPC ...... *B60W 30/0953* (2013.01); *B60W 60/001* (2020.02); *B60W 2540/30* (2013.01)

(58) Field of Classification Search

CPC ........... B60W 30/0953; B60W 60/001; B60W 2540/30

See application file for complete search history.

(56) References Cited

U.S. PATENT DOCUMENTS 9,227,632 B1 * 1/2016 Lee .................. B60W 30/0953
2018/0304889 A1 * 10/2018 Shalev-Shwartz ... G05D 1/0246
2020/0089977 A1 * 3/2020 Lakshmi Narayanan .................. G06F 18/253
2020/0307564 A1 * 10/2020 Rahimi .................... G06N 3/08
2023/0099555 A1 * 3/2023 Zhang ................ B62D 15/0265 701/41
2023/0138610 A1 * 5/2023 Sarode .............. B60W 60/0051 701/23
2023/0326335 A1 * 10/2023 Ding ........................ G06N 5/01 701/117

FOREIGN PATENT DOCUMENTS

DE 102016205141 A1 5/2017
DE 102023128248 A1 12/2024

* cited by examiner

*Primary Examiner* — Calvin Cheung

(74) *Attorney, Agent, or Firm* — Ingrassia Fisher & Lorenz, LLP | IFL

(57) ABSTRACT

In exemplary embodiments, methods and systems are provided that include one or more sensors of a vehicle that are configured to obtain sensor data as to operation of the vehicle; a satellite-based location system of the vehicle that is configured to obtain location data as to a geographic location of the vehicle; and a processor of the vehicle that is coupled to the one or more sensors and to the location system and that is configured to at least facilitate determining, using the sensor data and the location data, a maneuver for the vehicle based on an intent of a driver of the vehicle in initiating the maneuver; and characterizing one or more parameters as to an expected behavior of the vehicle based on the maneuver, utilizing a mathematical procedure including a probability function.

20 Claims, 5 Drawing Sheets

ADAPTIVE DRIVER INTENT DETECTION FOR DRIVER AND VEHICLE TYPE

TECHNICAL FIELD

The technical field generally relates to vehicles and, more specifically, to methods and systems for detecting driver intent for vehicle maneuvers.

BACKGROUND

Certain vehicles today have methods and system for detecting driver intent for vehicle maneuvers, such as evasive steering maneuvers, and so that corrective actions may be taken as appropriate.

Accordingly, it is desirable to provide methods and systems for detecting driver intention for vehicle maneuvers, such as evasive steering maneuvers, including in a manner that is adaptive for driver and vehicle type.

SUMMARY

In accordance with an exemplary embodiment, a method is provided that includes obtaining sensor data via one or more sensors of a vehicle, as to operation of the vehicle; obtaining location data via one or more satellite-based location systems of the vehicle, as to a geographic location of the vehicle; determining, via a processor of the vehicle using the sensor data and the location data, a maneuver for the vehicle based on an intent of a driver of the vehicle in initiating the maneuver; and characterizing, via the processor, one or more parameters as to an expected behavior of the vehicle based on the maneuver, utilizing a mathematical procedure including a probability function.

Also in an exemplary embodiment, the method includes taking an assisted vehicle control action, in accordance with instructions provided by the processor, based on the determining of the maneuver and the characterizing of the one or more parameters.

Also in an exemplary embodiment, the taking of the assisted vehicle control action includes providing automatic steering, braking, and/or propulsion of the vehicle via instructions provided by the processor in predicting driver intent, wherein the instructions for the assisted vehicle control action are based at least in part on the driver intent in addition to field data and driver behavior patterns.

Also in an exemplary embodiment, the method further includes adjusting, via the processor of the vehicle, the predicting of the one or more parameters, in an online closed loop onboard the vehicle.

Also in an exemplary embodiment, the method further includes adjusting, via a processor of a remote server that is coupled to the vehicle via a communication network, the predicting of the one or more parameters, offline from the vehicle based upon maneuver characteristics and learned vehicle parameters from a plurality of different drivers and a plurality of different vehicles of a different time.

Also in an exemplary embodiment, the method further includes adjusting, via the processor of the vehicle in addition to a processor of a remote server that is coupled to the vehicle via a communication network, the predicting of the one or more parameters, in a hybrid approach that utilizes online learning onboard the vehicle in addition to offline from the vehicle based upon maneuver characteristics and learned vehicle parameters from a plurality of different drivers and a plurality of different vehicles of a different time.

Also in an exemplary embodiment, the step of characterizing the one or more parameters includes characterizing the one or more parameters utilizing a sigmoid probability function that utilizes both a steepness "β" of a selected vehicle state variable "x", as well as a midpoint value "α" of the vehicle state variable "x", wherein the steepness "β" and the midpoint value "α" of the vehicle state variable "x" are both evolving as they are updated via the processor following the maneuver for adaptive learning for subsequent maneuvers.

Also in an exemplary embodiment, the sigmoid probability function is represented in accordance with the following equation:

$$P_{M,x}(x) = \frac{1}{1 + e^{-\beta(x-\alpha)}},$$

in which "$P_{M,x}(x)$" represents the probability function of the selected vehicle state variable "x" for maneuver "M".

Also in an exemplary embodiment, the selected vehicle state variable "x" includes one or more of the following: vehicle speed, a steering angle for the vehicle, and a torsion bar torque for the vehicle.

In another exemplary embodiment, a system is provided that includes one or more sensors of a vehicle that are configured to obtain sensor data as to operation of the vehicle; a satellite-based location system of the vehicle that is configured to obtain location data as to a geographic location of the vehicle; and a processor of the vehicle that is coupled to the one or more sensors and to the location system and that is configured to at least facilitate determining, using the sensor data and the location data, a maneuver for the vehicle based on an intent of a driver of the vehicle in initiating the maneuver; and characterizing one or more parameters as to an expected behavior of the vehicle based on the maneuver, utilizing a mathematical procedure including a probability function.

Also in an exemplary embodiment, the processor is further configured to at least facilitate taking an assisted vehicle control action, in accordance with instructions provided by the processor, based on the determining of the maneuver and the characterizing of the one or more parameters.

Also in an exemplary embodiment, the processor is further configured to at least facilitate taking the assisted vehicle control action by providing automatic steering, braking, and/or propulsion of the vehicle via instructions provided by the processor in predicting driver intent, and wherein the instructions for the assisted vehicle control action are based at least in part on the driver intent in addition to field data and driver behavior patterns.

Also in an exemplary embodiment, the processor is further configured to at least facilitate adjusting the predicting of the one or more parameters in an online closed loop onboard the vehicle.

Also in an exemplary embodiment, the system further includes a second processor that is disposed on a remote server that is remote from and coupled to the vehicle via a communication network, and that is configured to at least facilitate predicting of the one or more parameters, offline from the vehicle based upon maneuver characteristics and learned vehicle parameters from a plurality of different drivers and a plurality of different vehicles of a different time.

Also in an exemplary embodiment, the system further includes a second processor that is disposed on a remote server that is remote from and coupled to the vehicle via a communication network, and wherein the processor of the vehicle and the second processor of the remote server are configured to at least facilitate adjusting the predicting of the one or more parameters, in a hybrid approach that utilizes online learning onboard the vehicle in addition to offline from the vehicle based upon maneuver characteristics and learned vehicle parameters from a plurality of different drivers and a plurality of different vehicles of a different time.

Also in an exemplary embodiment, the processor is further configured to at least facilitate characterizing the one or more parameters utilizing a sigmoid probability function that utilizes both a steepness "β" of a selected vehicle state variable "x", as well as a midpoint value "α" of the vehicle state variable "x", wherein the steepness "β" and the midpoint value "α" of the vehicle state variable "x" are both evolving as they are updated via the processor following the maneuver for adaptive learning for subsequent maneuvers.

Also in an exemplary embodiment, the sigmoid probability function is represented in accordance with the following equation:

$$P_{M,x}(x) = \frac{1}{1 + e^{-\beta(x-\alpha)}},$$

in which "$P_{M,x}(x)$" represents the probability function of the selected vehicle state variable "x" for maneuver "M".

Also in an exemplary embodiment, the selected vehicle state variable "x" includes one or more of the following: vehicle speed, a steering angle for the vehicle, and a torsion bar torque for the vehicle.

In another exemplary embodiment, a system is provided that includes: a vehicle including a body; a drive system configured to generate movement of the body; one or more sensors of the vehicle that are configured to obtain sensor data as to operation of the vehicle; a location system of the vehicle that is configured to obtain location data as to a geographic location of the vehicle; and a first processor that is coupled to the one or more sensors and to the location system and that is configured to at least facilitate, onboard the vehicle: determining, using the sensor data and the location data, a maneuver for the vehicle based on an intent of a driver of the vehicle in initiating the maneuver; characterizing one or more parameters as to an expected behavior of the vehicle based on the maneuver, utilizing a mathematical procedure including a probability function; and taking an assisted vehicle control action, in accordance with instructions provided by the processor, based on the determining of the maneuver and the characterizing of the one or more parameters, wherein the processor is further configured to at least facilitate taking the assisted vehicle control action by providing automatic steering, braking, and/or propulsion of the vehicle via instructions provided by the processor in predicting driver intent and avoiding contact with one or more other vehicles during an evasive steering maneuver, and wherein the instructions for the assisted vehicle control action are based at least in part on the driver intent for the evasive steering maneuver in addition to field data and driver behavior patterns; and a remote server that is remote from and coupled to the vehicle via a wireless communication network and that includes a second processor that is configured to at least facilitate predicting of the one or more parameters, offline from the vehicle based upon maneuver characteristics and learned vehicle parameters from a plurality of different drivers and a plurality of different vehicles of a different time.

Also in an exemplary embodiment, the first processor is further configured to at least facilitate characterizing the one or more parameters utilizing a sigmoid probability function that utilizes both a steepness "β" of a selected vehicle state variable "x", as well as a midpoint value "α" of the vehicle state variable "x", wherein the steepness "β" and the midpoint value "α" of the vehicle state variable "x" are both evolving as they are updated via the processor following the maneuver for adaptive learning for subsequent maneuvers; and the sigmoid probability function is represented in accordance with the following equation:

$$P_{M,x}(x) = \frac{1}{1 + e^{-\beta(x-\alpha)}},$$

in which "$P_{M,x}(x)$" represents the probability function of the selected vehicle state variable "x" for maneuver "M".

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
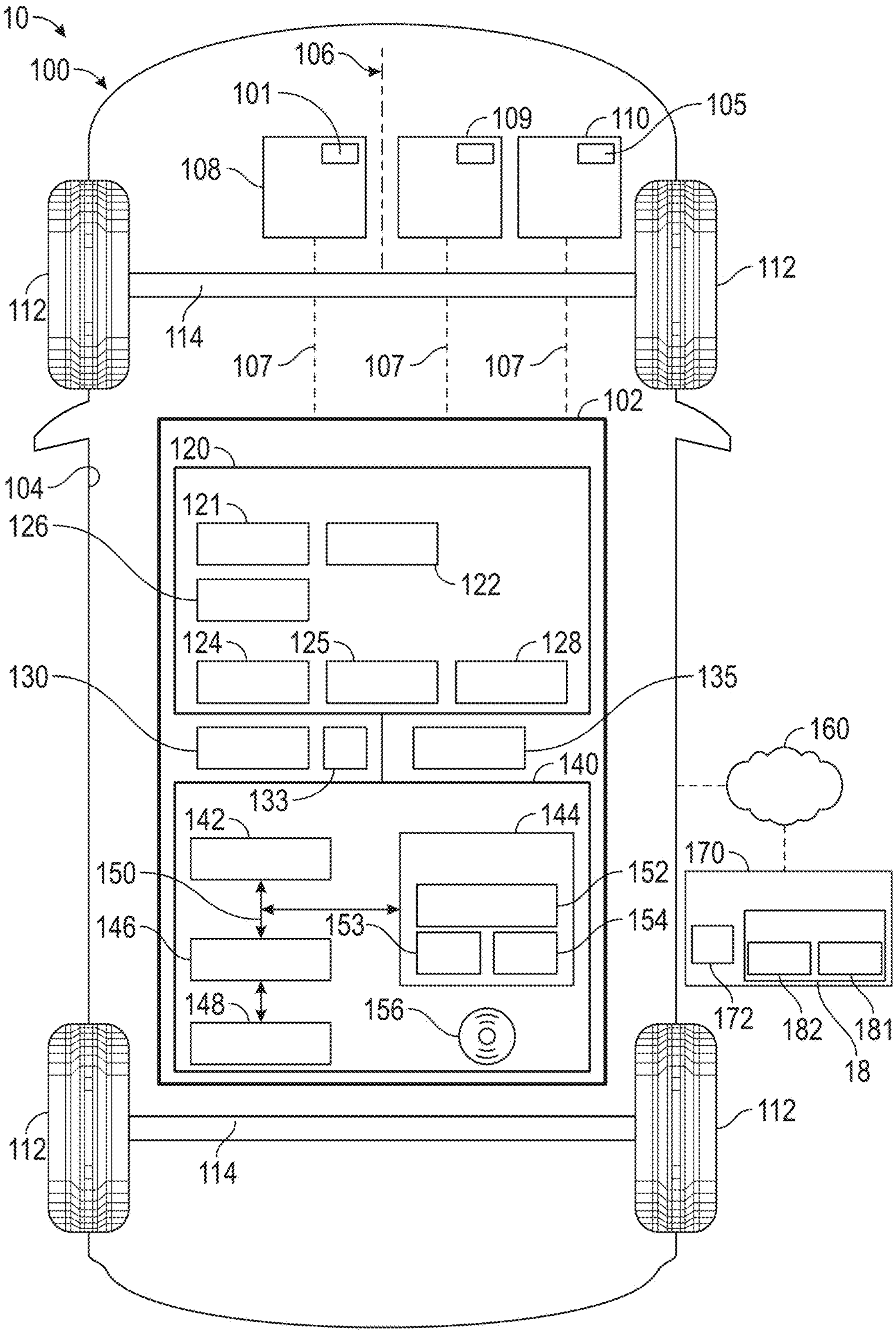
FIG. 1 is a functional block diagram of a system that includes a vehicle and a remote server, the vehicle having a control system for detecting driver intention for vehicle maneuvers, such as evasive steering maneuvers, including in a manner that is adaptive for driver and vehicle type, in accordance with exemplary embodiments.

FIG. 1 illustrates a system 10 that includes a vehicle 100 and a remote server 170. As illustrated in FIG. 1, the system 10 further includes one or more wireless communication networks 160 that communicatively couple together the vehicle 100 and the remote server 170. In various embodiments, the vehicle 100 is representative of a number of different vehicles (e.g., in a fleet) that are likewise coupled to the remote server 170 via the wireless communication networks 160, and that have similar features as those depicted in FIG. 1 and described below in connection with the vehicle 100. As described in greater detail below, the system 10 detects driver intention for vehicle maneuvers for the vehicle 100 (and in various embodiments, for other vehicles, such as other vehicles in a fleet), such as evasive steering maneuvers, including in a manner that is adaptive for driver and vehicle type.

In various embodiments, and as described below, the vehicle 100 includes a control system 102 for controlling various functions of the vehicle 100, including for detecting driver intention for vehicle maneuvers, such as evasive steering maneuvers, including in a manner that is adaptive for driver and vehicle type. In various embodiments, the vehicle 100 may also be referred to herein as a "host vehicle" (e.g. as differentiation from additional vehicles, which also may be referenced as "other vehicles" or "surrounding", for example which the vehicle 100 may be attempting to pass, such as in an evasive steering maneuver and/or other vehicle maneuvers). Also in various embodiments, when reference is made to the vehicle 100, it will be appreciated that this may similarly apply to other vehicles that are also part of the system 10 of FIG. 1 (e.g., in a fleet of vehicles).

In various embodiments, the vehicle 100 comprises an automobile. The vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain embodiments. In certain embodiments, the vehicle 100 may also comprise a motorcycle or other vehicle, such as aircraft, spacecraft, watercraft, and so on, and/or one or more other types of mobile platforms (e.g., a robot and/or other mobile platform).

In certain embodiments, the vehicle 100 may comprise an autonomous or semi-autonomous vehicle, for example in which vehicle control (including propulsion, steering, braking, and the like) is automatically planned and executed by the control system 102, in whole or in part. In certain other embodiments, the vehicle 100 may also be operated in whole or in part by a human driver. For example, in certain embodiments, vehicle maneuvers (such as evasive steering maneuvers, vehicle turs, and/or other vehicle maneuvers) may be initiated by a human driver, and the intent of the human driver in initiating the vehicle maneuver may be detected via the control system 102 and adapted for the driver and type of vehicle 100, for use in provided corrective actions as appropriate, in accordance with the process 200 of FIG. 2 and implementations of FIGS. 3A, 3B, 4, and 5 and described further below in accordance with exemplary embodiments.

In the depicted embodiment, the vehicle 100 includes a body 104 that is arranged on a chassis 116. The body 104 substantially encloses other components of the vehicle 100. The body 104 and the chassis 116 may jointly form a frame. The vehicle 100 also includes a plurality of wheels 112. The wheels 112 are each rotationally coupled to the chassis 116 near a respective corner of the body 104 to facilitate movement of the vehicle 100. In one embodiment, the vehicle 100 includes four wheels 112, although this may vary in other embodiments (for example for trucks and certain other vehicles).

A drive system 110 is mounted on the chassis 116, and drives the wheels 112, for example via axles 114. The drive system 110 preferably comprises a propulsion system. In certain embodiments, the drive system 110 provides propulsion in accordance with a driver intent as manifested via the driver's engagement of an accelerator pedal. Also in certain embodiments, the drive system 110 also provides automatic propulsion control in appropriate circumstances (e.g., in an evasive steering maneuver and/or other vehicle maneuver requiring automatic control assistance) in accordance with instructions provided by the control system 102.

In certain exemplary embodiments, the drive system 110 comprises an internal combustion engine and/or an electric motor/generator, coupled with a transmission thereof. In certain embodiments, the drive system 110 may vary, and/or two or more drive systems 110 may be used. By way of example, the vehicle 100 may also incorporate any one of, or combination of, a number of different types of propulsion systems, such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, a combustion/electric motor hybrid engine, and an electric motor.

As depicted in FIG. 1, the vehicle 100 also includes a braking system 108 and a steering system 109 in various embodiments. In exemplary embodiments, the braking system 108 controls braking of the vehicle 100 using braking components that are controlled via inputs provided by a driver (e.g., via a braking pedal 101 in certain embodiments) and/or automatically via the control system 102 in appropriate circumstances (e.g., in an evasive steering maneuver and/or other vehicle maneuver requiring automatic control assistance).

Also in exemplary embodiments, the steering system 109 controls steering of the vehicle 100 via steering components (e.g., a steering column coupled to the axles 114 and/or the wheels 112) that are controlled via inputs provided by a driver (e.g., via a steering wheel 103 in certain embodiments) and/or automatically via the control system 102 in appropriate circumstances (e.g., in an evasive steering maneuver and/or other vehicle maneuver requiring automatic control assistance). In certain embodiments, the steering system 109 comprises an electronic power steering system (EPS) for the vehicle 100.

In the embodiment depicted in FIG. 1, the control system 102 is coupled to the braking system 108, the steering system 109, and the drive system 110. As noted above, in certain embodiments, the vehicle 100 includes one or more functions controlled automatically via the control system 102, including for detecting driver intention for vehicle maneuvers, such as evasive steering maneuvers, including in a manner that is adaptive for driver and vehicle type, and including for taking corrective actions as appropriate (e.g., assistive steering, braking, and/or propulsion).

As depicted in FIG. 1, in various embodiments, the control system 102 includes a sensor array 120, a location system 130, a transceiver 133, a display 135, and a controller 140.

In various embodiments, the sensor array 120 includes various sensors that obtain sensor data pertaining to operation of the vehicle 100, including for determining driver intent for a vehicle maneuver. In the depicted embodiment, the sensor array 120 includes one or inertial measurement sensors 121, cameras 122, brake sensors 124, steering sensors 125, and speed sensors 126. In certain embodiments, the sensor array 120 may also include one or more other sensors 128.

In various embodiments, the inertial measurement sensors 121 are part of an inertial measurement unit (IMU) of the vehicle 100, and obtain IMU sensor data.

Also in various embodiments, the cameras 122 obtain camera images (also referred to herein as camera sensor data) from within the cabin of the vehicle 100 and/or outside the vehicle 100 (e.g., as to a roadway in which the vehicle 100 is travelling, one or more other vehicles or other objects along the roadway, and so on). In certain embodiments, the cameras 122 are part of a front camera module (FCM) of the vehicle 100.

Also in various embodiments, the brake sensors 124 obtain braking sensor data (e.g., as to brake pedal travel or force, braking torque, or the like). In various embodiments, the brake sensors 124 are part of or coupled to the braking system 108.

Also in various embodiments, the steering sensors 125 obtain steering sensor data (e.g., as to a steering angle, steering torque, or the like). In various embodiments, the steering sensors 125 are part of or coupled to the steering system 109 (e.g., an electric power steering system (EPS) in certain embodiments).

Also in various embodiments, the speed sensors 126 obtain speed sensor data (or velocity sensor data) as to a speed or velocity of the vehicle 100. In certain embodiments, the speed sensors 126 comprise one or more wheel speed sensors (WSS) that are coupled to one or more of the wheels 112 of the vehicle 100.

In various embodiments, the sensor array 120 may also include one or more other sensors 128 such as, by way of example, one or more transmission and/or gear sensors of the vehicle 100 (e.g., as to whether the engine is turned on, and/or a current gear of the vehicle 100, and so on), one or more other detection sensors for detecting other vehicles or objects on the roadway in which the vehicle 100 is travelling (e.g., one or more radar sensors, Lidar sensors, sonar sensors, or the like), and/or one or more other types of sensors.

Also in various embodiments, the location system 130 is configured to obtain and/or generate data as to a position and/or location in which the vehicle 100 is travelling and/or is about to park. In certain embodiments, the location system 130 comprises and/or or is coupled to a satellite-based network and/or system, such as a global positioning system (GPS) and/or other satellite-based system, and/or using a transmission control protocol (TCP) or the like.

In certain embodiments, the vehicle 100 also includes a transceiver 133. In various embodiments, the transceiver 133 communicates with the remote servers 170 via the one or more wireless communication networks 160.

In various embodiments, the display 135 provides information or instructions for a driver and/or other occupants of the vehicle 100. In certain embodiments, the display 135 provides, among other possible information, instructions or recommendations for the driver pertaining to a driving maneuver that has been initiated by the driver (e.g., pertaining to one or more assistive control actions provided via instructions provided via the control system 102 pertaining to the driving maneuver). In certain embodiments, the display 135 may provide a visual description on a display screen pertaining to the assistive control actions. In certain other embodiments, one or more audio, haptic, and/or other notifications may also be provided.

In various embodiments, the controller 140 is coupled to the sensor array 120, the location system 130, the transceiver 133, and the display 135. Also in various embodiments, the controller 140 comprises a computer system (also referred to herein as computer system 140), and includes a processor 142, a memory 144, an interface 146, a storage device 148, and a computer bus 150. In various embodiments, the controller (or computer system) 140 performs detection of driver intention for vehicle maneuvers, such as evasive steering maneuvers, including in a manner that is adaptive for driver and vehicle type and also that provides for planning of control actions (e.g., including assistive control actions in response to driver-initiated vehicle maneuvers) based on the sensor data obtained from the sensor array 120, and in certain embodiments from the location data obtained from the location system 130 (and, also in various embodiments, also from data obtained via the transceiver 133 from the remote server 170). In various embodiments, the controller 140 provides these and other functions in accordance with the steps of the processes and implementations depicted in FIGS. 2-5 and as described further below in connection therewith.

In various embodiments, the controller 140 (and, in certain embodiments, the control system 102 itself) is disposed within the body 104 of the vehicle 100. In one embodiment, the control system 102 is mounted on the chassis 116. In certain embodiments, the controller 140 and/or control system 102 and/or one or more components thereof may be disposed outside the body 104, for example on a remote server, in the cloud, or other device where image processing is performed remotely.

It will be appreciated that the controller 140 may otherwise differ from the embodiment depicted in FIG. 1. For example, the controller 140 may be coupled to or may otherwise utilize one or more remote computer systems and/or other control systems, for example as part of one or more of the above-identified vehicle 100 devices and systems.

In the depicted embodiment, the computer system of the controller 140 includes a processor 142, a memory 144, an interface 146, a storage device 148, and a bus 150. The processor 142 performs the computation and control functions of the controller 140, and may comprise any type of processor or multiple processors, single integrated circuits such as a microprocessor, or any suitable number of integrated circuit devices and/or circuit boards working in cooperation to accomplish the functions of a processing unit. During operation, the processor 142 executes one or more programs 152 contained within the memory 144 and, as such, controls the general operation of the controller 140 and the computer system of the controller 140, generally in executing the processes described herein, such as the processes and implementations depicted in FIGS. 2-5 and as described further below in connection therewith.

The memory 144 can be any type of suitable memory. For example, the memory 144 may include various types of dynamic random access memory (DRAM) such as SDRAM, the various types of static RAM (SRAM), and the various types of non-volatile memory (PROM, EPROM, and flash). In certain examples, the memory 144 is located on and/or co-located on the same computer chip as the processor 142. In the depicted embodiment, the memory 144 stores the above-referenced program 152 along with map data 153 (e.g., from and/or used in connection with the location system 130 and/or transceiver 133) and one or more stored values 154 (e.g., including, in various embodiments, threshold values).

The bus 150 serves to transmit programs, data, status and other information or signals between the various components of the computer system of the controller 140. The interface 146 allows communication to the computer system of the controller 140, for example from a system driver and/or another computer system, and can be implemented using any suitable method and apparatus. In one embodiment, the interface 146 obtains the various data from the sensor array 120 and/or the location system 130. The interface 146 can include one or more network interfaces to communicate with other systems or components. The interface 146 may also include one or more network interfaces to communicate with technicians, and/or one or more storage interfaces to connect to storage apparatuses, such as the storage device 148.

The storage device 148 can be any suitable type of storage apparatus, including various different types of direct access storage and/or other memory devices. In one exemplary embodiment, the storage device 148 comprises a program product from which memory 144 can receive a program 152 that executes one or more embodiments of the processes and implementations of FIGS. 2-5 and as described further below in connection therewith. In another exemplary embodiment, the program product may be directly stored in and/or otherwise accessed by the memory 144 and/or a disk (e.g., disk 157), such as that referenced below.

The bus 150 can be any suitable physical or logical means of connecting computer systems and components. This includes, but is not limited to, direct hard-wired connections, fiber optics, infrared and wireless bus technologies. During operation, the program 152 is stored in the memory 144 and executed by the processor 142.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 142) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the controller 140 may also otherwise differ from the embodiment depicted in FIG. 1, for example in that the computer system of the controller 140 may be coupled to or may otherwise utilize one or more remote computer systems and/or other control systems.

With continued reference to FIG. 1, as depicted in FIG. 1 and as described above, in various embodiments the remote server 170 is coupled to the vehicle 100 via the one or more wireless communication networks 160. As described in greater detail further below in connection with FIGS. 2-5, in various embodiments the remote server 170 also (along with the control system 102 in various embodiments) detecting of driver intention for vehicle maneuvers, such as evasive steering maneuvers, including in a manner that is adaptive for driver and vehicle type. In various embodiments, the remote server 170 provides these functions utilizing, among other components, a transceiver 172 and a computer system 180 including a processor 182 and memory 184, and with features similar to those described above in connection with the vehicle 100 (e.g. vehicle 100's transceiver 133, controller/computer system 140, processor 142, memory 144, and so on).

Figure 2:
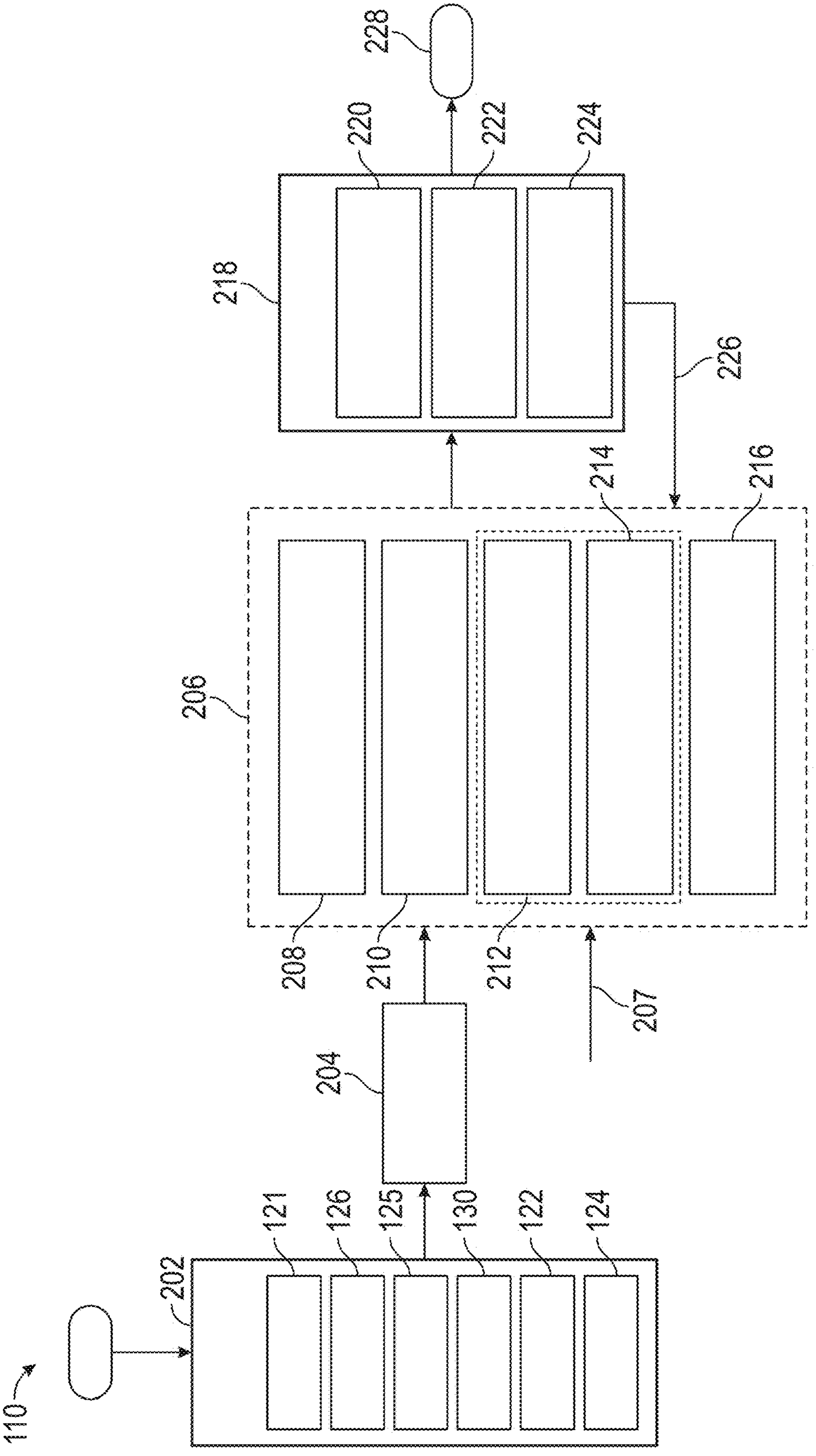
FIG. 2 is a flowchart for a process for detecting driver intention for vehicle maneuvers, such as evasive steering maneuvers, including in a manner that is adaptive for driver and vehicle type, and that can be implemented in connection with the system of FIG. 1, including the remote server and the vehicle and control system thereof, in accordance with exemplary embodiments.

With reference to FIG. 2, a flowchart is provided of a process 200 for detecting driver intention for vehicle maneuvers, such as evasive steering maneuvers, including in a manner that is adaptive for driver and vehicle type, in accordance with exemplary embodiments. In various embodiments, the process 200 can be implemented in connection with the system 10 of FIG. 1, including the remote server 170, the vehicle 100 (including the control system 102 thereof), and other components thereof. Also in various embodiments, the process 200 can also be implemented in connection with the various steps, processes, and implementations thereof as depicted in FIGS. 2-5 and as described further below in connection therewith.

As depicted in FIG. 2, the process 200 begins in certain embodiments when the vehicle 100 is turned on and/or begins operation (e.g., in a current vehicle drive). In one embodiment, the steps of the process 200 are performed continuously during operation of the vehicle.

In various embodiments, sensor and location data are obtained (step 202). In various embodiments, the sensor and location data includes sensor data obtained from the sensor array 120 of FIG. 1 regarding operation of the vehicle 100, along with location data from the location system 130 of FIG. 1 as to the location of the vehicle 100. In various embodiments, the sensor data includes inertial measurement sensor data from IMU sensors 121, speed sensor data from speed sensors 126, steering sensor data from steering sensors 125, camera sensor data from cameras 122, and brake sensor data from brake sensors 124 of FIG. 1.

In various embodiments, signal processing is performed (step 204). In various embodiments, the signal processing is performed via the processor 142 of FIG. 1 with respect to the sensor data and the location data of step 202, including to obtain a current geographic location of the vehicle 100 as it is operating as well as sensor data relating to the operation of the vehicle 100, including inertial measurement sensor values, speed values (e.g., vehicle speed), steering values (e.g., steering angle and/or torque), camera images (e.g., of other vehicles and/or other objects in proximity to the vehicle 100), and brake sensor values (e.g., brake pedal engagement and/or braking torque).

In various embodiments, the data of steps 202 and 204 are utilized in subprocess 206 in making various determinations pertaining to the vehicle 100. As illustrated in FIG. 2, in various embodiment, the subprocess 206 includes steps 208-216, as described below.

In various embodiments, as a first step in the subprocess 206, parameter determinations are made (step 208). Specifically, in various embodiments, predictions are made (including by the processor 142 of FIG. 1) as to a driving maneuver being initiated by the driver of the vehicle 100, including as to a formulation of one or more parameters relating to the driving maneuver. As referenced throughout, in certain embodiments such a driving maneuver includes an evasive steering maneuver in which the driver of the vehicle 100 swervers and/or steers quickly around or away from another vehicle (e.g., if the other vehicle is immediately in front of the host vehicle 100 such that the host vehicle 100 may otherwise contact the other vehicle). In certain embodiments, the driving maneuver (also referred to herein as a vehicle maneuver) may comprise a lane change, a vehicle turn, and/or any number of other types of maneuvers.

In certain embodiments, during step 208, a probabilistic prediction is made by the processor 142 utilizing a probably function to estimate the likelihood of occurrence of multiple different vehicle state parameters. In certain embodiments, a sigmoid function is utilized. In one such embodiment, the probability function is represented as follows:

$$P_{M,x}(x) = \frac{1}{1 + e^{-\beta(x-\alpha)}}, \quad \text{(Equation 1)}$$

in which:

"x" represents vehicle states that include vehicle speed ($v_x$), steering angle (δ), torsion bar torque (τ), and so on;

"$P_{M,x}$(x)" represents the probability function of variable "x" for maneuver "M";

"β" represents a Sigmoid steepness of variable "x"; and

"α" represents a Sigmoid midpoint of variable "x" (i.e., such that both β and α represents influential parameters), wherein the steepness "β" and the midpoint value "α" of the vehicle state variable "x" are both evolving as they are updated via the processor 142 following the maneuver for adaptive learning for subsequent maneuvers.

Figure 3A:
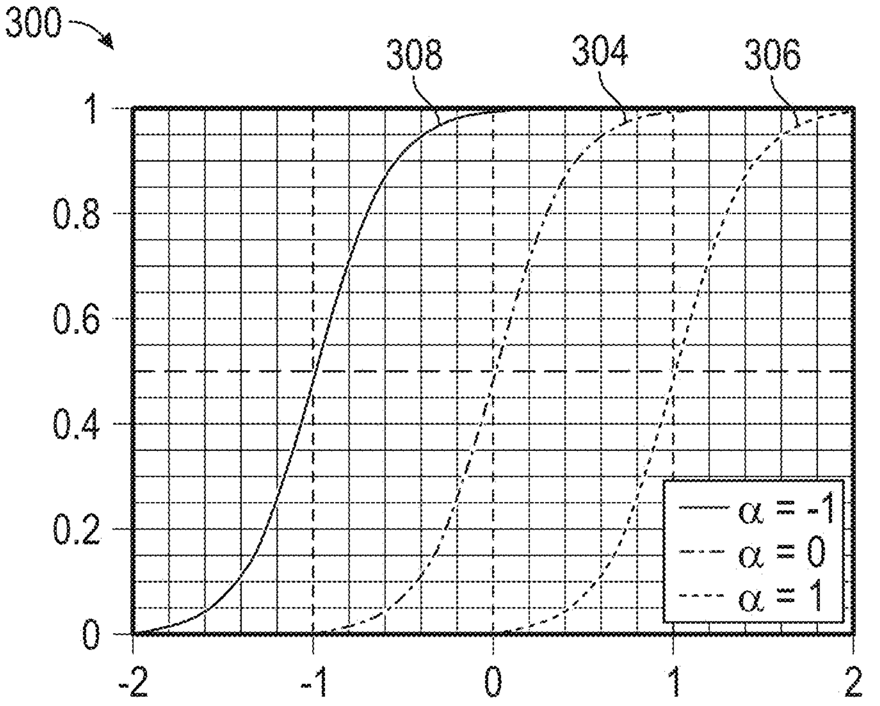
FIGS. 3A and 3B depict implementations of a step of the process of FIG. 2 pertaining to parameter determination, in accordance with exemplary embodiments.

With reference first to FIG. 3A, an illustration 300 is provided in applying Sigmoid "α" with respect to the selected variable "x". In an exemplary embodiment, a represents the midpoint at which fifty percent (50%) probability occurs. Specifically, in an exemplary embodiment, as the value of α increases, this shifts the probability function to the right. For example, in the illustration of FIG. 3A, when the value of α in this example is equal to zero, this corresponds to middle curve 304 as shown in FIG. 3A. When the value of α increases to positive one, this shifts the curve to the right, shown as right curve 306 in FIG. 3A. Conversely, when the value of α instead decreases to negative one, this shifts the curve to the left, shown as left curve 308 in FIG. 3A.

Figure 3B:
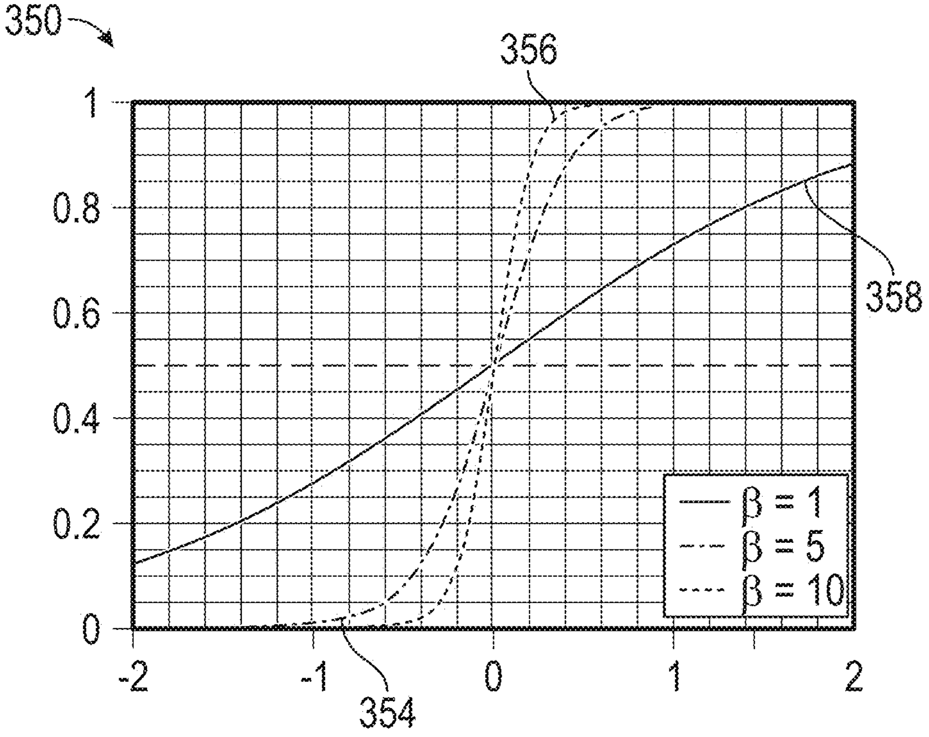

With reference next to FIG. 3B, an illustration 350 is provided in applying Sigmoid "β" with respect to the selected variable "x". In an exemplary embodiment, β represents the steepness control parameter. Specifically, in an exemplary embodiment, as the value of β increases, this creates a rapid probability change. Conversely, in an embodiment, as the value of β decreases, this creates a more smooth transition. For example, in the illustration of FIG. 3B, when the value of β in this example is equal to five this corresponds to middle curve 354 as shown in FIG. 3B. When the value of β increases to ten, this results in a relatively steeper curve 356 in FIG. 3B. Conversely, when the value of β instead decreases to one, this results in a relatively smoother curve 358 in FIG. 3B.

With reference back to FIG. 2, in various embodiments, as a second step in the subprocess 206, desired parameter determinations are made (step 210). Specifically, in various embodiments, predictions are made (including by the processor 142 of FIG. 1) as to a desired maneuver prediction parameter.

In certain embodiments, during step 210, the predicted probability can be mapped to a desired variable under the function "g" (e.g., an inverse function), in accordance with the following equations:

$$D_p = g(P_{M,x}(x)), \text{ and} \quad \text{(Equation 2)}$$

$$D_p(x, \alpha, \beta) = g\left(\frac{1}{1 + e^{-\beta(x-\alpha)}}\right), \quad \text{(Equation 3)}$$

in which $D_p$ represents the predicted probability mapped to the desired variable.

In various embodiments, the predicted maneuver can be compared to the expected desired behavior when the maneuver occurs, which is denoted herein as $D_d$. Also in various embodiments, the process 200 (and the associated systems, such as the control system 102 of FIG. 1) can self-learn (and/or self-update) the parameters for subsequent driving maneuvers, including utilizing the following equation:

$$I = D_{p,k} - D_{d,k}(x, \alpha_k, \beta), \quad \text{(Equation 4)}$$

in which "I" is an innovation term.

In addition, in various embodiments, in situations in inverse function of "g" is available (i.e., "$g^{-1}$"), for various parameters to be learned, this inverse $g^{-1}$ can be expressed in accordance with the following equations:

$$g^{-1}(D_d(x, \alpha)) = \beta, \text{ and} \quad \text{(Equation 5)}$$

$$g^{-1}(D_d(x, \beta)) = \alpha, \quad \text{(Equation 6)}$$

In addition, in various embodiments, in order to update the value of β, the innovation term "I" can be rewritten as follows:

$$I_\beta = D_{p,k} - D_{d,k}(x, \alpha_k, \beta) = g^{-1}(D_{p,k}) - g^{-1}(D_{d,k}(x, \alpha)) = \beta_{p,k} - \beta_{d,k}. \quad \text{(Equation 7)}$$

With reference back to FIG. 2, in various embodiments, as a third step in the subprocess 206, parameter learning is performed (step 212). Specifically, in various embodiments, learning may be performed with respect to the parameters (e.g., via the processor 142 of the vehicle 100 of FIG. 1 and/or the processor 182 of the remote server 170 of FIG. 1) utilizing data from the vehicle 100 and its current driver, as well as with different drivers and/or different vehicles of a similar type (e.g., a same or similar make and/or model of vehicle, using data that is collected from various vehicles, such as in a fleet). In various embodiments, such parameter learning can thus be adapted to the particular driver and/or for the particular vehicle 100 (and/or type of vehicle 100). In various embodiments, the parameter learning can be conducted either online, offline, and/or a hybrid combination of online and offline learning, for example as described in greater detail further below.

With continued reference to FIG. 2, in various embodiments, as a fourth step in the subprocess 206, parameter updating is performed (step 214). Specifically, in various embodiments, parameter updating may be performed with respect to the parameters (e.g., via the processor 142 of the vehicle 100 of FIG. 1 and/or the processor 182 of the remote server 170 of FIG. 1) utilizing data from the vehicle 100 and its current driver, as well as with different drivers and/or different vehicles of a similar type (e.g., a same or similar make and/or model of vehicle, using data that is collected from various vehicles, such as in a fleet).

In various embodiments, a parameter B is updated in step 214 in accordance with the following equation:

$$\beta_{k+1}=\beta_{p,k}+\gamma(\beta_{p,k}-\beta_{d,k}), \quad \text{(Equation 8)}$$

in which "$\gamma$" represents a learning factor.

Also in various embodiments, an additional parameter a can also be updated in step 214 in accordance with the following equation;

$$\alpha_{k+1}=\alpha_{p,k}+\gamma(\alpha_{p,k}-\alpha_{d,k}), \quad \text{(Equation 9)}$$

in which "$\gamma$" similarly represents a learning factor.

In various embodiments, the learning may be either adaptive or static, and may also utilize the following equations:

$$\begin{bmatrix}\alpha_T\\ \beta_T\\ \vdots\end{bmatrix}_{k+1}=\begin{bmatrix}\alpha_T\\ \beta_T\\ \vdots\end{bmatrix}_k+\gamma g_k^{-1}(D_{p,k}(k)-D_{d,k}(\alpha,\beta)), \quad \text{(Equation 10)}$$

in which the learning factor "$\gamma$" is between zero and one, inclusive (i.e., is greater than or equal to zero and less than or equal to one), and $$\begin{bmatrix}\alpha_T\\ \beta_T\\ \vdots\end{bmatrix}_{k+1}=\begin{bmatrix}\alpha_T\\ \beta_T\\ \vdots\end{bmatrix}_k+\Gamma(D_{p,k}(k)-D_{d,k}(\alpha,\beta)), \quad \text{(Equation 11)}$$

in which "$\Gamma$" represents an adaptive gain.

Also in various embodiments, for some parameters that can be linearized, a linear filter may be utilized for estimating such parameters. In addition, in various embodiments with non-linear estimation, a non-linear filter may be utilized, such as an extended Kalman filter (EKF).

With continued reference to FIG. 2, in various embodiments, as a fifth step in the subprocess 206, hybrid learning is performed (step 216). Specifically, in various embodiments, hybrid learning is performed in accordance with the subprocess set forth in FIG. 4 and described directly below.

Figure 4:
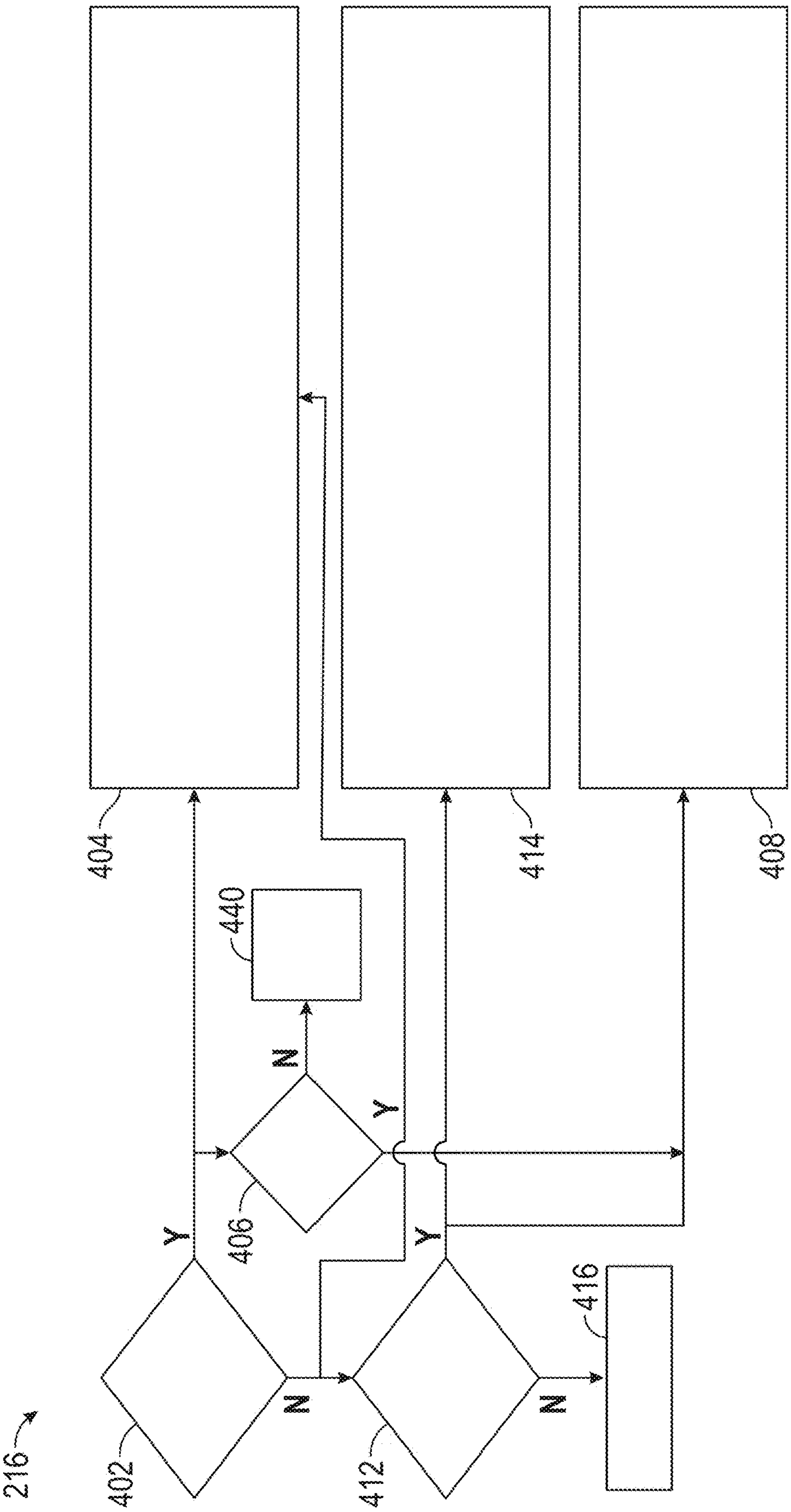
FIG. 4 is a flowchart of a process for a step of the process of FIG. 2, namely of hybrid learning, in accordance with exemplary embodiments.

With reference to FIG. 4, in an exemplary embodiment, a determination is made as to whether a maneuver has occurred in the vehicle (step 402). In various embodiments, this is determined via a processor, such as the processor 142 and/or processor 182 of FIG. 1, using the sensor data. In various embodiments, this is determined using IMU sensor data, steering sensor data, braking sensor data, and the like.

In various embodiments, if it is determined that a maneuver has occurred in the vehicle, then online learning is performed (step 404) (also referred to as online learning 207 in FIG. 2). Specifically, in various embodiments, online learning is performed onboard the vehicle 100 (i.e., via the processor 142 of the vehicle) in a closed loop in accordance with the following equation:

$$\begin{bmatrix}\alpha_T\\ \beta_T\\ \vdots\end{bmatrix}_{k+1_{ON}}=\begin{bmatrix}\alpha_T\\ \beta_T\\ \vdots\end{bmatrix}_{k_{ON}}+\gamma_{ON}\ g_k(D_{p,k}(\alpha,\beta)-D_{m,k}(k)). \quad \text{(Equation 12)}$$

Also in various embodiments, if it is determined that a maneuver has occurred in the vehicle, then (in addition to the online learning of step 404) a determination is made as to whether there is sufficient data from multiple vehicles and/or drivers sufficient to perform robust analysis across the multiple vehicles and/or drivers (step 406) (e.g., as to whether a quantity of data as to different vehicles and/or drivers exceed one or more predetermined thresholds as stored in the memory 144 as stored values 154 therein, and/or as similarly stored in the memory 184 of FIG. 1). In various embodiments, this determination is made by one or more of the processors 142 and/or 182 of FIG. 1.

In various embodiments, if it is determined in step 406 that there is sufficient data, then hybrid learning is performed (step 408), in addition to the above-described online learning of step 404. Specifically, in various embodiments, during step 408, hybrid learning is performed both on the vehicle 100 (via the processor 142) as well as at the remote server 170 (via the processor 182). In various embodiments, the hybrid learning of step 408 is performed in accordance with the following equation:

$$\begin{bmatrix}\alpha_T\\ \beta_T\\ \vdots\end{bmatrix}=(1-\gamma_{Hybrid})\begin{bmatrix}\alpha_T\\ \beta_T\\ \vdots\end{bmatrix}_{ON}+\gamma_{Hybrid}\begin{bmatrix}\alpha_T\\ \beta_T\\ \vdots\end{bmatrix}_{OFF}. \quad \text{(Equation 13)}$$

Conversely, if it is instead determined in step 406 that there is insufficient data, then hybrid learning is not performed (step 410). Instead, in various embodiments, only online learning (step 404) is performed under this circumstance.

With reference back to step 402, if it is instead determined that a vehicle maneuver has not occurred in the vehicle, then the process instead process instead proceeds to step 412. In various embodiments, during step 412 a determination is made (similar to the above described step 406) as to whether there is sufficient data from multiple vehicles and/or drivers sufficient to perform robust analysis across the multiple vehicles and/or drivers.

In various embodiments, if it is determined in step 412 that there is sufficient data, then offline learning is provided in step 408 (as described above) in addition to offline learning in step 414 (also referred to in FIG. 2 as offline learning 226 in FIG. 2). In various embodiments, during step 412, the offline learning is performed at the remote server 170 of FIG. 1 (via the processor 182 thereof) in accordance with the following equation:

$$\begin{bmatrix}\alpha_T\\ \beta_T\\ \vdots\end{bmatrix}_{k+1_{OFF}}=\begin{bmatrix}\alpha_T\\ \beta_T\\ \vdots\end{bmatrix}_{k_{OFF}}+\gamma_{OFF}\ g_k(D_{p,k}(\alpha,\beta)-D_{m,k}(k)). \quad \text{(Equation 14)}$$

In various embodiments, if it is instead determined in step 412 that there is insufficient data, then no learning is performed (step 416).

Figure 5:
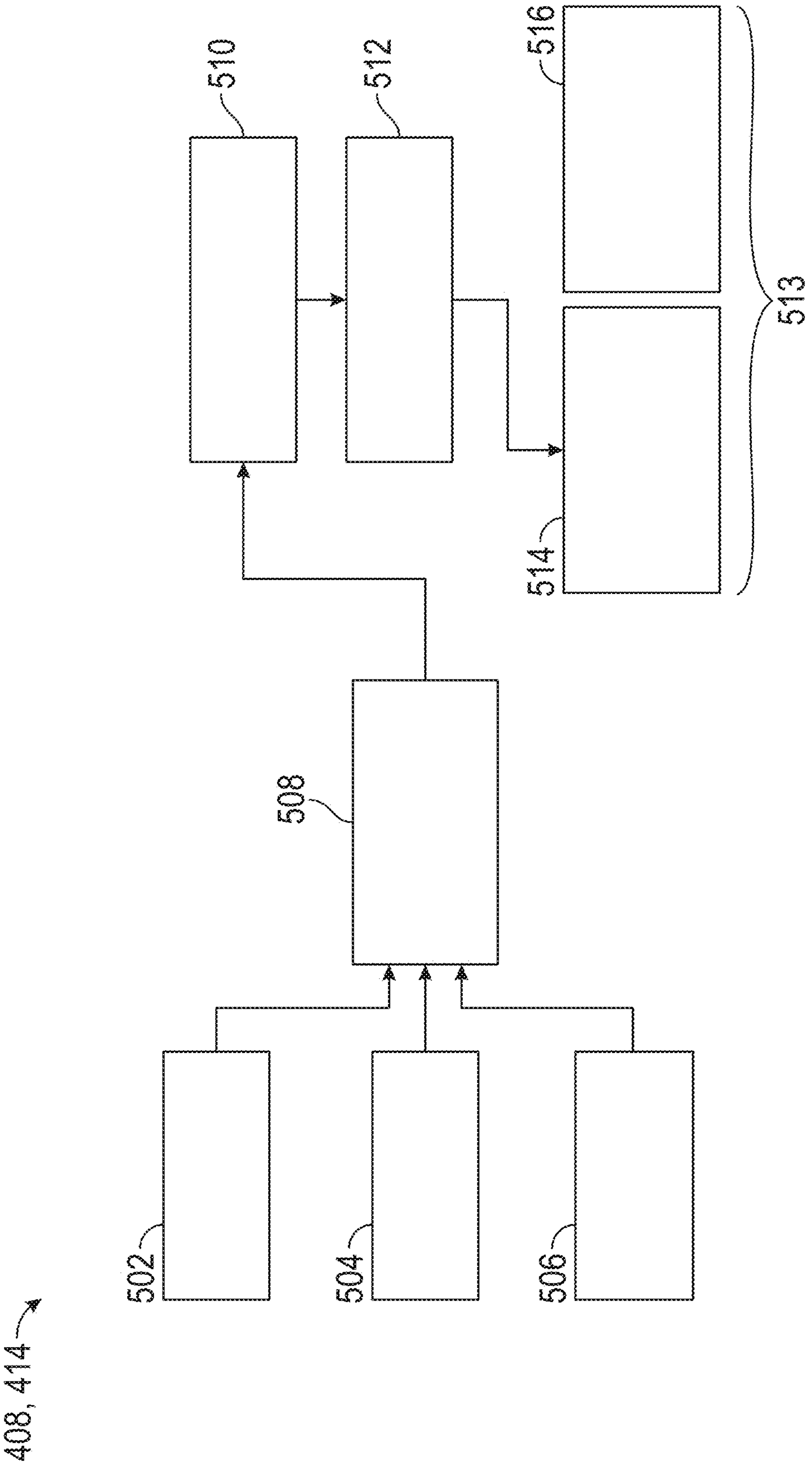
FIG. 5 is a flowchart of a process for one or more steps of the process of FIG. 2, namely of back office processing, in accordance with exemplary embodiments.

With reference to FIG. 5, an illustrative flowchart is provided representing back-office processing that is performed by the remote server 170 of FIG. 1 in accordance with the hybrid learning of step 408 an the offline learning of step 414 of FIG. 4.

With continued reference to FIG. 5, in an exemplary embodiment a forward event alert (e.g., pertaining to contact with another vehicle) is detected (step 502) based on the sensor data (e.g., IMU sensor data and/or other sensor data). In addition, in various embodiments, significant steering (e.g., a sudden rapid change in steering angle and/or torque) may likewise be detected (step 504) based on the sensor data (e.g., based on the steering sensor data). In addition, in various embodiments, field maneuver data may also be detected (step 506), such as via other types of data (e.g., camera sensor data, location data, and so on) representing a vehicle maneuver.

In various embodiments, upon the occurrence of one of these detection of events (e.g., of steps 502, 504, and/or 506), an array of maneuver data is obtained. In various embodiment, the collected data may include, among other types of data, the following data with respect to the vehicles: driver torque, lateral acceleration, yaw rate, host vehicle velocity, host vehicle acceleration, lateral position deviation, heading deviation, steering angle, torque command, longitudinal position, lateral position, heading, closest in path vehicle (CIPV) distance, CIPV velocity, CIPV acceleration, CIPV heading, driver intent state, driver intent confidence, and so on, among other possible types of data.

In various embodiments, the data collected is then stored in a back office database (step 510), such as in the memory 184 of the computer system 180 of the remote server 170 of FIG. 1. Also in various embodiments, the offline and/or hybrid learning (such as those described above in connection with FIG. 4) are performed using the stored data, along with previously stored data at the remote server (step 512).

Finally, parameters are updated for the driver and/or vehicle 100 (and/or for other similar vehicles) for subsequent detection and action pertaining to future vehicle maneuvers (step 513). In various embodiments, the parameters pertaining to the vehicle maneuver are updated based on the learning of step 512 using the data stored in step 510. Also in various embodiments, the updating includes both an over the air (OTA) update for existing programs of the vehicle 100 (step 514) as well as updating engine control unit (ECU) parameters for the vehicle 100 for future programs and maneuvers (step 516).

With reference back to FIG. 2, as a result of the determinations of the sub-process 206 (including the determinations as to the maneuver and related parameters as well as the learning pertaining thereto) various actions are taken in various embodiments (step 218).

First, in various embodiments, vehicle control actions are taken (step 220). In various embodiments, during step 220, the processor 142 of FIG. 1 provides assisted vehicle control actions for controlling movement of the vehicle 100 for corrective action pertaining to the detected maneuver (e.g., in order to help the driver execute the intended maneuver without contacting another vehicle or object, and the like). In various embodiments, the processor 142 provides instructions for the corrective vehicle control action to one or more of the braking system 108, steering system 109, and/or drive system 110 of the vehicle 100, which then implement automatic corrective braking, steering, and/or propulsion adjustments, respectively, in accordance with the instructions provided by the processor 142. Also in various embodiments, during step 220, the vehicle control action is automatically taken in accordance with the instructions provided by the processor 142 that are based on predicting driver intent and avoiding contact with one or more other vehicles during an evasive steering maneuver, and that are also based at least in part on the driver intent for the evasive steering maneuver in addition to field data and driver behavior patterns.

Also in various embodiments, one or more planning actions may also be taken (step 222). For example, in certain embodiments, such planning actions may include adjusting a route of travel for the vehicle 100, providing notifications for the driver (e.g., via the display 135 of FIG. 1, and so on).

Finally, in various embodiments, smart system learning may also be performed (step 224). In various embodiments, such smart system learning may help to provide further enhanced detection of specific vehicle events, and so on.

In various embodiments, the process 200 then terminates at step 228.

In various embodiments, the techniques described above in connection with the process 200 can help to provide earlier and/or improved accurate detection of vehicle maneuvers, such as an evasive steering maneuvers, vehicle lane changes, vehicle turns, and/or other vehicle maneuvers, and that further provides for earlier and/or improved automatic correction actions to be provided.

Accordingly, methods, systems, and vehicles are provided for detecting driver intention for vehicle maneuvers, such as evasive steering maneuvers, including in a manner that is adaptive for driver and vehicle type.

It will be appreciated that the systems, vehicles, and methods may vary from those depicted in the Figures and described herein. For example, the system 10, including the remote server 170, the vehicle 100 of FIG. 1 and the control system 102 thereof, and/or other components thereof may differ from that depicted in FIG. 1. It will similarly be appreciated that the steps of the processes and implementations of FIGS. 2-5 may differ from those depicted in the Figures, and/or that various steps may occur concurrently and/or in a different order than that depicted in the Figures.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method comprising:

obtaining sensor data via one or more sensors of a vehicle, as to operation of the vehicle;

obtaining location data via one or more satellite-based location systems of the vehicle, as to a geographic location of the vehicle;

determining, via a processor of the vehicle using the sensor data and the location data, a maneuver for the vehicle based on an intent of a driver of the vehicle in initiating the maneuver;

characterizing, via the processor, one or more parameters as to an expected behavior of the vehicle based on the maneuver, utilizing a mathematical procedure including a probability function;

adjusting, via the processor of the vehicle, the characterizing of the one or more parameters, in an online closed loop onboard the vehicle; and taking an assisted vehicle control action, in accordance with instructions provided by the processor, based on the determining of the maneuver and the characterizing of the one or more parameters.

2. The method of claim 1, wherein the taking of the assisted vehicle control action comprises providing automatic steering, braking, and/ or propulsion of the vehicle via instructions provided by the processor in predicting driver intent, wherein the instructions for the assisted vehicle control action are based at least in part on the driver intent in addition to field data and driver behavior patterns.

3. The method of claim 1, further comprising:

adjusting, via a processor of a remote server that is coupled to the vehicle via a communication network, the characterizing of the one or more parameters, based upon maneuver characteristics and learned vehicle parameters from a plurality of different drivers and a plurality of different vehicles of a different time.

4. The method of claim 1, further comprising:

adjusting, via the processor of the vehicle in addition to a processor of a remote server that is coupled to the vehicle via a communication network, the characterizing of the one or more parameters, in a hybrid approach that utilizes online learning onboard the vehicle in addition to offline from the vehicle based upon maneuver characteristics and learned vehicle parameters from a plurality of different drivers and a plurality of different vehicles of a different time.

5. The method of claim 1, wherein the step of characterizing the one or more parameters comprises characterizing the one or more parameters utilizing a sigmoid probability function that utilizes both a steepness "β" of a selected vehicle state variable "x", as well as a midpoint value "α" of the vehicle state variable "x", wherein the steepness "β" and the midpoint value "α" of the vehicle state variable "x" are both evolving as they are updated via the processor following the maneuver for adaptive learning for subsequent maneuvers.

6. The method of claim 5, wherein the sigmoid probability function is represented in accordance with the following equation:

$$P_{M,x}(x) = \frac{1}{1 + e^{-\beta(x-\alpha)}},$$

in which "$P_{M,\,x}$(x)" represents the probability function of the selected vehicle state variable "x" for maneuver "M".

7. The method of claim 6, wherein the selected vehicle state variable "x" comprises one or more of the following: vehicle speed, a steering angle for the vehicle, and a torsion bar torque for the vehicle.

8. A system comprising:

one or more sensors of a vehicle that are configured to obtain sensor data as to operation of the vehicle;

a satellite-based location system of the vehicle that is configured to obtain location data as to a geographic location of the vehicle; and a processor of the vehicle that is coupled to the one or more sensors and to the location system and that is configured to at least facilitate:

determining, using the sensor data and the location data, a maneuver for the vehicle based on an intent of a driver of the vehicle in initiating the maneuver;

characterizing one or more parameters as to an expected behavior of the vehicle based on the maneuver, utilizing a mathematical procedure including a probability function;

adjusting the characterizing of the one or more parameters in an online closed loop onboard the vehicle; and taking an assisted vehicle control action, in accordance with instructions provided by the processor, based on the determining of the maneuver and the characterizing of the one or more parameters.

9. The system of claim 8, wherein the processor is further configured to at least facilitate taking the assisted vehicle control action by providing automatic steering, braking, and/or propulsion of the vehicle via instructions provided by the processor in predicting driver intent, and wherein the instructions for the assisted vehicle control action are based at least in part on the driver intent in addition to field data and driver behavior patterns.

10. The system of claim 8, further comprising a second processor that is disposed on a remote server that is remote from and coupled to the vehicle via a communication network, and that is configured to at least facilitate predicting of the one or more parameters based upon maneuver characteristics and learned vehicle parameters from a plurality of different drivers and a plurality of different vehicles of a different time.

11. The system of claim 8, further comprising a second processor that is disposed on a remote server that is remote from and coupled to the vehicle via a communication network, and wherein the processor of the vehicle and the second processor of the remote server are configured to at least facilitate adjusting the characterizing of the one or more parameters, in a hybrid approach that utilizes online learning onboard the vehicle in addition to offline from the vehicle based upon maneuver characteristics and learned vehicle parameters from a plurality of different drivers and a plurality of different vehicles of a different time.

12. The system of claim 8, wherein the processor is further configured to at least facilitate characterizing the one or more parameters utilizing a sigmoid probability function that utilizes both a steepness "β" of a selected vehicle state variable "x", as well as a midpoint value "α" of the vehicle state variable "x", wherein the steepness "β" and the midpoint value "α" of the vehicle state variable "x" are both evolving as they are updated via the processor following the maneuver for adaptive learning for subsequent maneuvers.

13. The system of claim 12, wherein the sigmoid probability function is represented in accordance with the following equation:

$$P_{M,x}(x) = \frac{1}{1 + e^{-\beta(x-\alpha)}},$$

in which "$P_{M,\,x}$(x)" represents the probability function of the selected vehicle state variable "x" for maneuver "M".

14. The system of claim 13, wherein the selected vehicle state variable "x" comprises one or more of the following: vehicle speed, a steering angle for the vehicle, and a torsion bar torque for the vehicle.

15. A system comprising:

a vehicle comprising:

a body;

a drive system configured to generate movement of the body;

one or more sensors of the vehicle that are configured to obtain sensor data as to operation of the vehicle;

a location system of the vehicle that is configured to obtain location data as to a geographic location of the vehicle; and a first processor that is coupled to the one or more sensors and to the location system and that is configured to at least facilitate, onboard the vehicle:

determining, using the sensor data and the location data, a maneuver for the vehicle based on an intent of a driver of the vehicle in initiating the maneuver;

characterizing one or more parameters as to an expected behavior of the vehicle based on the maneuver, utilizing a mathematical procedure including a probability function;

adjusting the characterizing of the one or more parameters in an online closed loop onboard the vehicle; and taking an assisted vehicle control action, in accordance with instructions provided by the first processor, based on the determining of the maneuver and the characterizing of the one or more parameters, wherein the first processor is further configured to at least facilitate taking the assisted vehicle control action by providing automatic steering, braking, and/or propulsion of the vehicle via instructions provided by the first processor in predicting driver intent and avoiding contact with one or more other vehicles during an evasive steering maneuver, and wherein the instructions for the assisted vehicle control action are based at least in part on the driver intent for the evasive steering maneuver in addition to field data and driver behavior patterns; and a remote server that is remote from and coupled to the vehicle via a wireless communication network and that includes a second processor that is configured to at least facilitate predicting of the one or more parameters based upon maneuver characteristics and learned vehicle parameters from a plurality of different drivers and a plurality of different vehicles of a different time.

16. The system of claim 15, wherein:

the first processor is further configured to at least facilitate characterizing the one or more parameters utilizing a sigmoid probability function that utilizes both a steepness "β" of a selected vehicle state variable "x", as well as a midpoint value "α" of the vehicle state variable "x", wherein the steepness "β" and the midpoint value "α" of the vehicle state variable "x" are both evolving as they are updated via the processor following the maneuver for adaptive learning for subsequent maneuvers; and the sigmoid probability function is represented in accordance with the following equation:

$$P_{M,x}(x) = \frac{1}{1 + e^{-\beta(x-\alpha)}},$$

in which "$P_{M,x}(x)$" represents the probability function of the selected vehicle state variable "x" for maneuver "M".

17. The system of claim 16, wherein the selected vehicle state variable "x" comprises a vehicle speed for the vehicle.

18. The system of claim 16, wherein the selected vehicle state variable "x" comprises a steering angle for the vehicle.

19. The system of claim 16, wherein the selected vehicle state variable "x" comprises a torsion bar torque for the vehicle.

20. The system of claim 16, wherein the selected vehicle state variable "x" comprises one or more of the following: vehicle speed, a steering angle for the vehicle, and a torsion bar torque for the vehicle.

* * * * *